United States Patent Office 2,775,618
Patented Dec. 25, 1956

2,775,618

CHLORINATED ACYL PEROXIDES AND METHOD FOR THEIR MANUFACTURE

Albert L. Dittman, Jersey City, N. J., and John M. Wrightson, Whittier, Calif., assignors to The M. W. Kellogg Company, Jersey City, N. J., a corporation of Delaware No Drawing. Original application May 11, 1951, Serial No. 225,850, now Patent No. 2,705,706, dated April 5, 1955. Divided and this application April 11, 1952, Serial No. 281,866

3 Claims. (Cl. 260—610)

This invention relates to the manufacture of perhalocarbons. In one of its aspects, the invention relates to the manufacture of perhalocarbon plastics, oils, greases and waxes. More particularly in this aspect, the invention relates to a method for the polymerization of perhalo-olefins to produce normally liquid and solid perhalopolymers. Still more particularly in this latter aspect, the invention relates to a method for the polymerization of trifluorochloroethylene to produce normally liquid and solid polymers of this monomer.

This invention is a division of our prior and copending application Serial No. 225,850, filed May 11, 1951 now U. S. Patent 2,705,706, issued April 5, 1955; and a continuation-in-part of our prior and copending application Serial No. 98,276, filed June 10, 1949, now U. S. Patent 2,636,908 issued April 2, 1953.

Normally liquid and solid perhalocarbons have been produced by the polymerization of a monomer in the presence of certain promoters, and, in the case of liquids, also in the presence of a chain-transfer solvent. For example, under suitable conditions of temperature and residence time, and in the presence of trichloroacetyl peroxide, trifluorochloroethylene can be polymerized to obtain chemically and physically stable, solid polymers having a variety of uses. Benzoyl peroxide has been employed to produce liquid polymers. The disadvantages of these promoters in comparison with the promoters of the present invention, reside in their being more expensive to produce, and in being unstable at relatively high temperatures. In the case of benzoyl peroxide, there is the further disadvantage that the fragments of promoter attached to the polymer contain hydrogen which makes the polymer less stable.

It is, therefore, an object of the present invention to polymerize perhalo-olefins under suitable conditions in the presence of a new promoter to produce perhalopolymers.

Another object of the invention is to provide an improved method for producing perhalo-olefin polymers of predetermined chemical and physical characteristics and high yields.

Still another object of the invention is to provide an improved method for producing polymers of trifluorochloroethylene.

A further object of the invention is to provide a novel promoter suitable for use in the polymerization of perhalo-olefins to produce perhalo-polymers.

A still further object of the invention is to provide a method for producing a novel promoter suitable for use in the polymerization of perhalo-olefins to produce perhalo-polymers.

Various other objects and advantages of the present invention will become apparent to those skilled in the art from the accompanying description and disclosure.

As herein employed, perhalocarbons are defined as compounds consisting substantially exclusively of carbon and halogen with any degree of unsaturation and containing only negligible amounts of other elements, such as hydrogen and oxygen, in a quantity less than about 2 weight percent as impurities. These other elements are derived from materials utilized in the process as will hereinafter become apparent. Perhalo-olefins are defined as perhalo-olefins having any degree of unsaturation, and consisting of halogens and carbon. Perfluoro-olefins are defined as perhalo-olefins having any degree of unsaturation and consisting of fluorine and carbon. Perfluorochloro-olefins are defined as perhalo-olefins consisting of fluorine, chlorine and carbon. The preferred perfluorochloro-olefins of this invention are those containing not more than one chlorine atom per carbon atom.

According to this invention, perhalo-olefins are homopolymerized or copolymerized under suitable polymerization conditions in the presence of a halogenated acyl peroxide having at least 6 carbon atoms per molecule as a promoter, to produce oils and greases at normal atmospheric temperature, and waxes, including hard waxes having softening points extending to about 200° C., and normally solid material of the nature of thermal plastics, in high yields with good selectivity for the desired product.

The perhalo-olefins which may be homopolymerized or copolymerized in accordance with the process of the invention include perfluoro-olefins and perfluorochloro-olefins, such as trifluorochloroethylene, tetrafluoroethylene, perfluorobutadiene, difluorodichloroethylene including both $CF_2=CCl_2$ and $CFCl=CFCl$, perfluoropropene, perfluoromonochloropropene, perfluorobutene, perfluoromonochlorobutene, diphenyldifluroethylene, etc. Typical examples of copolymerization of the above perhalo-olefins include the copolymerization of trifluorochloroethylene and fluorochloroisobutene; of trifluorochloroethylene and diphenyldifluoroethylene; of trifluorochloroethylene and tetrafluoroethylene; of trifluorochloroethylene and vinylidene fluoride; of trifluorochloroethylene and vinyl fluoride; of trifluorochloroethylene and vinyl chloride; of trifluorochloroethylene and vinylidene chloride; of trifluorochloroethylene and perfluoropropene; of trifluorochloroethylene and trifluoroethylene; and of perfluorobutadiene and perfluorostyrene, etc.

The term "polymerization" includes, in its broadest sense, both homopolymerization and copolymerization of the perhalo-olefins with other compounds. The term "homopolymerization" includes the use of up to 5 percent of a comonomer, which does not necessarily affect the characteristics of the product, but which is used as a modifier.

In the polymerization of trifluorochloroethylene, to which this invention has particular application, to produce either normally liquid or solid perhalo-polymers, the promoter employed is a major factor in effecting the polymerization and determining the molecular weight, yield and characteristics of the product produced. According to the invention, as indicated above, polymerization or copolymerization of perhalo-olefins is carried out in the presence of a halogenated acyl peroxide having at least 6 carbon atoms per molecule, as a promoter. Examples of such promoters include the completely halogenated propionyl peroxides such as trifluorodichloropropionyl peroxide, trichlorodifluoropropinyl peroxide, tetrafluorochloropropionyl peroxide, tetrachlorofluoropropionyl peroxide, and perchloropropionyl peroxide; and partially halogenated propionyl peroxides such as, tetrachloropropionyl peroxide, and the completely halogenated butyryl peroxides such as pentafluorodichlorobutyryl peroxide, pentachlorodifluorobutyryl peroxide, tetrafluorotrichlorobutyryl peroxide, tetrachlorotrifluorobutyryl peroxide, and perchlorobutyryl peroxide; and partially halogenated butyryl peroxides such as tetrachlorobutyryl peroxide, and the completely halogenated valeryl peroxides such as septafluorodichlorovaleryl peroxide, pentafluorotetrachlorovaleryl peroxide, pentachlorotetrafluorovaleryl peroxide, and perchlorovaleryl peroxide; and the partially halogenated valeryl peroxides such as tetrachlorovaleryl peroxide, etc. The completely halogenated peroxides are preferred.

The concentration of the halogenated acyl peroxide, used as a promoter in accordance with the process of the invention, is important in determining the molecular weight, yield and characteristics of the product produced. In the case of producing normally solid polymers of the nature of thermoplastics, the amount of promoter used usually varies between about 0.01 and about 0.5 weight percent of the monomer in the reaction mixture, depending upon the molecular weight of the ultimate product to be produced. In the case of producing normally liquid and waxy polymers, the amount of promoter used varies between about 0.5 and about 10 weight percent of the monomer in the reaction mixture, with a preferred range between about 2 and about 6 weight percent of the monomer in the reaction mixture.

In general, it has been observed when producing polymers employing the aforementioned halogenated acyl peroxides having at least 6 carbon atoms per molecule, as promoters, an increase in the amount of promoter used, within the aforementioned range of concentrations, results in a decrease of the molecular weight of the resulting product. In the case of the solid plastic produced, the N. S. T. value is proportional to the molecular weight and therefore indicates, relatively, the molecular weight of the polymer produced. The N. S. T. value is defined as the no-strength-temperature of the solid polymer.

A preferred promoter, of the class of halogenated acyl peroxides having at least 6 carbon atoms per molecule of the present invention, is trifluorodichloropropionyl peroxide. The preparation of this peroxide is characteristic of the method for the preparation of other peroxides of the group of halogenated acyl peroxides of this invention. This peroxide may be prepared by first forming trifluorodichloropropionyl chloride ($CF_3CCl_2COCl$). Trifluorodichloropropionyl chloride is prepared by bubbling chlorine and oxygen through trifluorotrichloropropene ($CF_3CCl=CCl_2$) in the presence of actinic radiation, (for example, ultra-violet light) to produce trifluorodichloropropionyl chloride, as a liquid.

Liquid trifluorodichloropropionyl chloride thus produced, is next reacted with sodium peroxide ($Na_2O_2$) suspended in aqueous sodium chloride solution (20% by weight of sodium chloride) to yield the desired trifluorodichloropropionyl peroxide. The quantity of trifluorodichloropropionyl chloride reacted with sodium peroxide is in accordance with stoichiometric requirements, although excess trifluorodichloropropionyl chloride may also be used. The reaction is carried out at a temperature in the range between about $-20°$ C. and about $0°$ C., and preferably at a temperature of about $-16°$ C., in an open mixing vessel at atmospheric pressure. Reaction takes place almost instantaneously.

The peroxide (trifluorodichloropropionyl peroxide) is recovered from the reaction mixture by extraction with Freon-11 (trichloromonofluoromethane). The peroxide crystallizes when the Freon solution is cooled to about $-70°$ C. and is purified by washing and recrystallizing in fresh Freon-11. The purified peroxide is then dissolved in Freon-11 and diluted to the desired concentration for polymerization.

The following examples will serve to illustrate the method for the preparation of trifluorodichloropropionyl peroxide and may also be applied to the preparation of other peroxides of the group of halogenated acyl peroxides of the present invention.

*Example I*

21.6 grams of trifluorodichloropropionyl chloride (which is 3.4 grams in excess of the stoichiometric quantity) was reacted with 3.3 grams of sodium peroxide suspended in 248 grams of sodium chloride solution (20% sodium chloride by weight) at $-16°$ C. The above reaction produced a yield of 10.3 grams of trifluorodichloropropionyl peroxide.

*Example II*

18.2 grams of trifluorodichloropropionyl chloride (which is the stoichiometric quantity) was reacted with 3.3 grams of sodium peroxide in 248 grams of sodium chloride solution (20% sodium chloride by weight) at $-16°$ C. The above reaction produced a yield of 10.7 grams of trifluorodichloropropionyl peroxide.

Various modifications of the aforementioned process of the invention will be apparent to those skilled in the art, without departing from the scope of the invention.

We claim:

1. Trifluorodichloropropionyl peroxide, in which all fluorine substituents appear at the terminal carbon atoms.

2. A method for preparing trifluorodichloropropionyl peroxide which comprises: reacting trifluorodichloropropionyl chloride with sodium peroxide suspended in an aqueous solution of sodium chloride at a temperature between about $-20°$ C. and about $0°$ C. to produce trifluorodichloropropionyl peroxide, in which all fluorine substituents appear at the terminal carbon atoms, as a product of the process.

3. A method for preparing trifluorodichloropropionyl peroxide which comprises: reacting trifluorodichloropropionyl chloride with sodium peroxide suspended in an aqueous solution of sodium chloride at a temperature between about $-20°$ C. and about $0°$ C. to produce a reaction mixture comprising trifluorodichloropropionyl peroxide, in which all fluorine substituents appear at the terminal carbon atoms; extracting trifluorodichloropropionyl peroxide from said reaction mixture with trichloromonofluoromethane; and recovering crystals of trifluorodichloropropionyl peroxide from the resulting mixture as a product of the process.

References Cited in the file of this patent

UNITED STATES PATENTS

| | | |
|---|---|---|
| 2,467,280 | Walter | Apr. 12, 1949 |
| 2,559,630 | Bullit | July 10, 1951 |
| 2,564,024 | Miller | Aug. 14, 1951 |
| 2,580,358 | Miller | Dec. 25, 1951 |
| 2,580,373 | Zimmerman | Dec. 25, 1951 |
| 2,636,908 | Dittman et al. | Apr. 28, 1953 |